(12) United States Patent
Saviano et al.

(10) Patent No.: US 8,471,871 B1
(45) Date of Patent: Jun. 25, 2013

(54) AUTHORITATIVE TEXT SIZE MEASURING

(75) Inventors: Steven Joseph Saviano, Brooklyn, NY (US); Evan Adams, San Leandro, CA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/274,797

(22) Filed: Oct. 17, 2011

(51) Int. Cl.
*G09G 5/00* (2006.01)

(52) U.S. Cl.
USPC .......................................... 345/661; 345/753

(58) Field of Classification Search
USPC ................................... 345/661, 753; 709/203
See application file for complete search history.

(56) References Cited

U.S. PATENT DOCUMENTS

| | | |
|---|---|---|
| 5,231,577 A | 7/1993 | Koss |
| 5,408,470 A | 4/1995 | Rothrock et al. |
| 5,557,722 A | 9/1996 | DeRose et al. |
| 5,758,358 A | 5/1998 | Ebbo |
| 5,761,669 A | 6/1998 | Montague et al. |
| 5,793,966 A | 8/1998 | Amstein et al. |
| 5,819,304 A | 10/1998 | Nilsen et al. |
| 6,049,664 A | 4/2000 | Dale et al. |
| 6,243,706 B1 | 6/2001 | Moreau et al. |
| 6,327,584 B1 | 12/2001 | Xian et al. |
| 6,341,305 B2 | 1/2002 | Wolfe |
| 6,349,308 B1 | 2/2002 | Whang et al. |
| 6,349,314 B1 | 2/2002 | Patel |
| 6,418,441 B1 | 7/2002 | Call |
| 6,501,779 B1 | 12/2002 | McLaughlin et al. |
| 6,766,333 B1 | 7/2004 | Wu et al. |
| 6,988,241 B1 | 1/2006 | Guttman et al. |
| 7,017,112 B2 | 3/2006 | Collie et al. |
| 7,031,954 B1 | 4/2006 | Kirsch |
| 7,035,910 B1 | 4/2006 | Dutta et al. |
| 7,069,502 B2 | 6/2006 | Numata et al. |
| 7,162,693 B2 | 1/2007 | Yamanaka et al. |
| 7,213,199 B2 | 5/2007 | Humenansky et al. |
| 7,437,421 B2 | 10/2008 | Bhogal et al. |
| 7,478,330 B1 * | 1/2009 | Branson et al. ................ 715/738 |
| 7,491,399 B2 | 2/2009 | Vakharia |
| 7,506,242 B2 | 3/2009 | Kotler et al. |
| 7,529,778 B1 | 5/2009 | Dewey et al. |
| 7,656,543 B2 | 2/2010 | Atkins |
| 7,680,932 B2 | 3/2010 | Defaix et al. |
| 7,698,379 B2 | 4/2010 | Dutta et al. |
| 7,774,703 B2 | 8/2010 | Junuzovic et al. |

(Continued)

OTHER PUBLICATIONS

Ellis et al., "Concurrency Control in Groupware Systems," ACM 1989, pp. 399-406.

(Continued)

*Primary Examiner* — Djenane Bayard
(74) *Attorney, Agent, or Firm* — Ropes & Gray LLP

(57) ABSTRACT

Methods and systems for uniform rendering of text across a plurality of client computing devices using a server are disclosed. In one aspect, a method includes sending the document from the server to the plurality of client computing devices and receiving initial text formatting information at the server from a first client computing device in the plurality of client computing devices. The method further includes generating revised text formatting information on the server for the first client computing device in the plurality of client computing devices and sending the revised text formatting information from the server to the first client computing device in the plurality of client computing devices for re-rendering of the document so that the document text appears substantially the same on each client computing device.

27 Claims, 5 Drawing Sheets

U.S. PATENT DOCUMENTS

| | | |
|---|---|---|
| 7,890,928 B2 | 2/2011 | Patrudu |
| 8,019,780 B1 | 9/2011 | Pinkerton et al. |
| 8,151,204 B2 | 4/2012 | Lusen et al. |
| 8,266,534 B2 | 9/2012 | Curtis et al. |
| 2001/0037346 A1 | 11/2001 | Johnson |
| 2002/0032701 A1 | 3/2002 | Gao et al. |
| 2002/0035580 A1 | 3/2002 | Tanabe |
| 2002/0133492 A1 | 9/2002 | Goldstein et al. |
| 2002/0174085 A1 | 11/2002 | Nelson et al. |
| 2003/0014406 A1 | 1/2003 | Faieta et al. |
| 2003/0037076 A1 | 2/2003 | Bravery et al. |
| 2003/0037303 A1 | 2/2003 | Bodlaender et al. |
| 2003/0084078 A1 | 5/2003 | Torii et al. |
| 2004/0044965 A1 | 3/2004 | Toyama et al. |
| 2004/0085354 A1 | 5/2004 | Massand |
| 2004/0088653 A1 | 5/2004 | Bell et al. |
| 2004/0133444 A1 | 7/2004 | Defaix et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0248612 A1 | 12/2004 | Lee et al. |
| 2005/0091291 A1 | 4/2005 | Kaler et al. |
| 2005/0125461 A1 | 6/2005 | Filz |
| 2005/0131887 A1* | 6/2005 | Rohrabaugh et al. ............ 707/3 |
| 2005/0185636 A1 | 8/2005 | Bucher |
| 2005/0200896 A1 | 9/2005 | Narusawa et al. |
| 2005/0273695 A1 | 12/2005 | Schnurr |
| 2006/0031751 A1 | 2/2006 | Ehud |
| 2006/0075332 A1 | 4/2006 | Fairweather et al. |
| 2006/0101071 A1 | 5/2006 | Henderson |
| 2006/0149831 A1 | 7/2006 | Dutta et al. |
| 2006/0200755 A1 | 9/2006 | Melmon et al. |
| 2006/0230344 A1* | 10/2006 | Jennings et al. ............ 715/522 |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0288637 A1 | 12/2007 | Layton et al. |
| 2008/0028302 A1 | 1/2008 | Meschkat |
| 2008/0040659 A1 | 2/2008 | Doyle |
| 2008/0059417 A1 | 3/2008 | Yamada et al. |
| 2008/0059539 A1 | 3/2008 | Chin et al. |
| 2008/0082604 A1* | 4/2008 | Mansour et al. ............ 709/203 |
| 2008/0126943 A1 | 5/2008 | Parasnis et al. |
| 2008/0127212 A1 | 5/2008 | Nakamizo et al. |
| 2009/0112953 A1 | 4/2009 | Barsness et al. |
| 2009/0112990 A1 | 4/2009 | Campbell et al. |
| 2009/0132907 A1 | 5/2009 | Shao et al. |
| 2009/0307585 A1* | 12/2009 | Tranchant et al. ............ 715/269 |
| 2010/0030578 A1 | 2/2010 | Siddique et al. |
| 2010/0059539 A1 | 3/2010 | Giraud et al. |
| 2010/0083096 A1 | 4/2010 | Dupuis-Latour et al. |
| 2010/0205230 A1 | 8/2010 | Simeonov et al. |
| 2010/0205520 A1 | 8/2010 | Parish et al. |
| 2010/0218099 A1 | 8/2010 | van Melle et al. |
| 2010/0235763 A1 | 9/2010 | Massand |
| 2010/0245256 A1 | 9/2010 | Estrada et al. |
| 2010/0251122 A1 | 9/2010 | Lee et al. |
| 2010/0252335 A1 | 10/2010 | Orsley |
| 2010/0318894 A1* | 12/2010 | Billharz et al. ............ 715/234 |
| 2011/0066957 A1 | 3/2011 | Prats et al. |
| 2011/0085211 A1 | 4/2011 | King et al. |
| 2011/0099093 A1* | 4/2011 | Mills ............................ 705/27.2 |
| 2011/0164043 A1 | 7/2011 | Arora et al. |
| 2011/0179427 A1 | 7/2011 | Krishnamoorthy et al. |
| 2011/0219331 A1* | 9/2011 | Deluca et al. ................ 715/799 |
| 2011/0252299 A1 | 10/2011 | Lloyd et al. |
| 2011/0264712 A1 | 10/2011 | Ylonen |
| 2012/0117406 A1 | 5/2012 | Eun |
| 2012/0117452 A1 | 5/2012 | Lloyd et al. |
| 2012/0131483 A1 | 5/2012 | Archer et al. |

OTHER PUBLICATIONS

Huang et al., "A General Purpose Virtual Collaboration Room," Google 1999, pp. 1-9.

Kindberg, Mushroom: A Framework for Collaboration and Interaction across the Internet, Google 1996, pp. 1-11.

Pacull et al., Duplex: A Distributed Collaborative Editing Environment in Large Scale, ACM 1994, pp. 165-173.

Tsompanopoulou et al., "A Platform for Delivering Multimedia Presentations on Cultural Heritage," 2010 14th Panhellenic Conference on Informatics, pp. 175-179.

Non-Final Office Action dated Jan. 6, 2012 for U.S. Appl. No. 13/275,093.

Non-Final Office Action dated Jan. 17, 2012 for U.S. Appl. No. 13/274,717.

Non-Final Office Action dated Feb. 17, 2012 for U.S. Appl. No. 13/275,123.

Non-Final Office Action dated Feb. 29, 2012 for U.S. Appl. No. 13/274,723.

Non-Final Office Action dated Mar. 1, 2012 for U.S. Appl. No. 13/275,101.

Non-Final Office Action dated Dec. 30, 2011 for U.S. Appl. No. 13/274,720.

Krieger, Stephanie "Documents, Presentations, and Workbooks: Using Microsoft® Office to Create Content That Gets Noticed," published May 2011, pp. 1-104.

Raggett, Dave "Slidy—a web based alternative to Microsoft PowerPoint," published 2006, pp. 1-13.

"Simultaneously edit a presentation with other authors," by Microsoft™ Office: MAC, published Nov. 11, 2010, pp. 1-4.

Taylor, Dave "Cool Apple Keynote Presentation Tricks and Tips," published Apr. 2011, p. 1-5.

Non Final Office Action dated Jul. 20, 2012 for U.S. Appl. No. 13/084,951.

Non Final Office Action dated Aug. 31, 2012 for U.S. Appl. No. 13/275,101.

Advisory Action dated Sep. 7, 2012 for U.S. Appl. No. 13/274,723.

Non Final Office Action dated Sep. 7, 2012 for U.S. Appl. No. 13/226,165.

Non-Final Office Action dated Oct. 24, 2012 for U.S. Appl. No. 11/497,206.

Final Office Action dated Dec. 7, 2012 for U.S. Appl. No. 13/275,123.

Final Office Action dated Nov. 16, 2012 for U.S. Appl. No. 13/274,716.

* cited by examiner

AUTHORITATIVE TEXT SIZE MEASURING

FIELD OF THE DISCLOSURE

The present disclosure relates generally to rendering text on an computing device and in particular to rendering text in collaborative document processing systems.

BACKGROUND OF THE INVENTION

Traditionally, the viewing and editing of electronic documents—such as word processing documents, spreadsheets, and presentations—was done using specific software applications installed on a computing device. Recently, online document processing applications have been developed which makes it possible for people to create these documents without having document processing software specially installed. These online applications provide access to the document processing features through an Internet browser. The actual documents are stored on the application server, but may be downloaded locally to a client computing device. Because the documents are stored centrally and are accessed via an Internet browser, it is possible for multiple people to view, edit, and share the document regardless of the hardware and software capabilities of the computing device they are using.

The appearance of the same text in an electronic document may differ from one computing device to another. In particular, the appearance of the same text may differ among various Internet browsers. For example, the height or width of the characters may be different or the line breaks may occur at different points in the text. There are several reasons for these differences. Browsers may have different versions of the same font installed. Browsers may also use different algorithms for kerning (determining the amount of space between characters), layout, sizing, or rendering. Furthermore, some browsers may engage in sub-pixel rendering if the display screen of the computing device allows.

In online document processing applications, uniform appearance of text is important. If the size and line breaks of the text do not appear the same across different computing devices, it can cause confusion among different users who view or edit the document from different computing devices. Current solutions to the uniform text rendering problem generally have relied on having the same display or rendering program installed in each computing device.

SUMMARY OF THE INVENTION

It is preferable to find a solution that can display text uniformly regardless of the hardware or software capabilities of the computing device. Systems and methods are disclosed herein for rendering text on a client computing device by a server. In one aspect, a computerized method includes sending text from a server to the client computing device for rendering and receiving at the server initial text formatting information from the client computing device. The method further includes generating revised text formatting information on the server and sending the revised text formatting information from the server to the client computing device for re-rendering of the text in accordance with the revised text formatting information.

In another aspect, a computerized method for displaying a document on a plurality of client computing devices by a server includes sending the document from the server to the plurality of client computing devices and receiving initial text formatting information at the server from a first client computing device in the plurality of client computing devices. The method further includes generating revised text formatting information on the server for the first client computing device in the plurality of client computing devices and sending the revised text formatting information from the server to the first client computing device in the plurality of client computing devices for re-rendering of the document so that the document text appears substantially the same on each client computing device.

In another aspect, a system for displaying a document on a plurality of client computing devices includes a server. The server is configured to send the document to the plurality of client computing devices, receive initial text formatting information from each client computing device, generate revised text formatting information for each client computing device, and send the revised text formatting information to each client computing device for re-rendering of the document so that the document text appears substantially the same on each client computing device.

In another aspect, a computerized method for re-rendering text on a client computing device by a server includes receiving initial text formatting information at the server from the client computing device. The method further includes generating revised text formatting information on the server and sending the revised text formatting information from the server to the client computing device for re-rendering of the text in accordance with the revised text formatting information.

In another aspect, a computerized method for server-side rendering of text on a client computing device includes receiving text from the server on the client computing device, generating initial text formatting information on the client computing device, and sending the initial text formatting information to the server. The method further includes receiving revised text formatting information from the server and re-rendering the text in accordance with the revised text formatting information.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for displaying a document on a plurality of client computing devices by a server. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
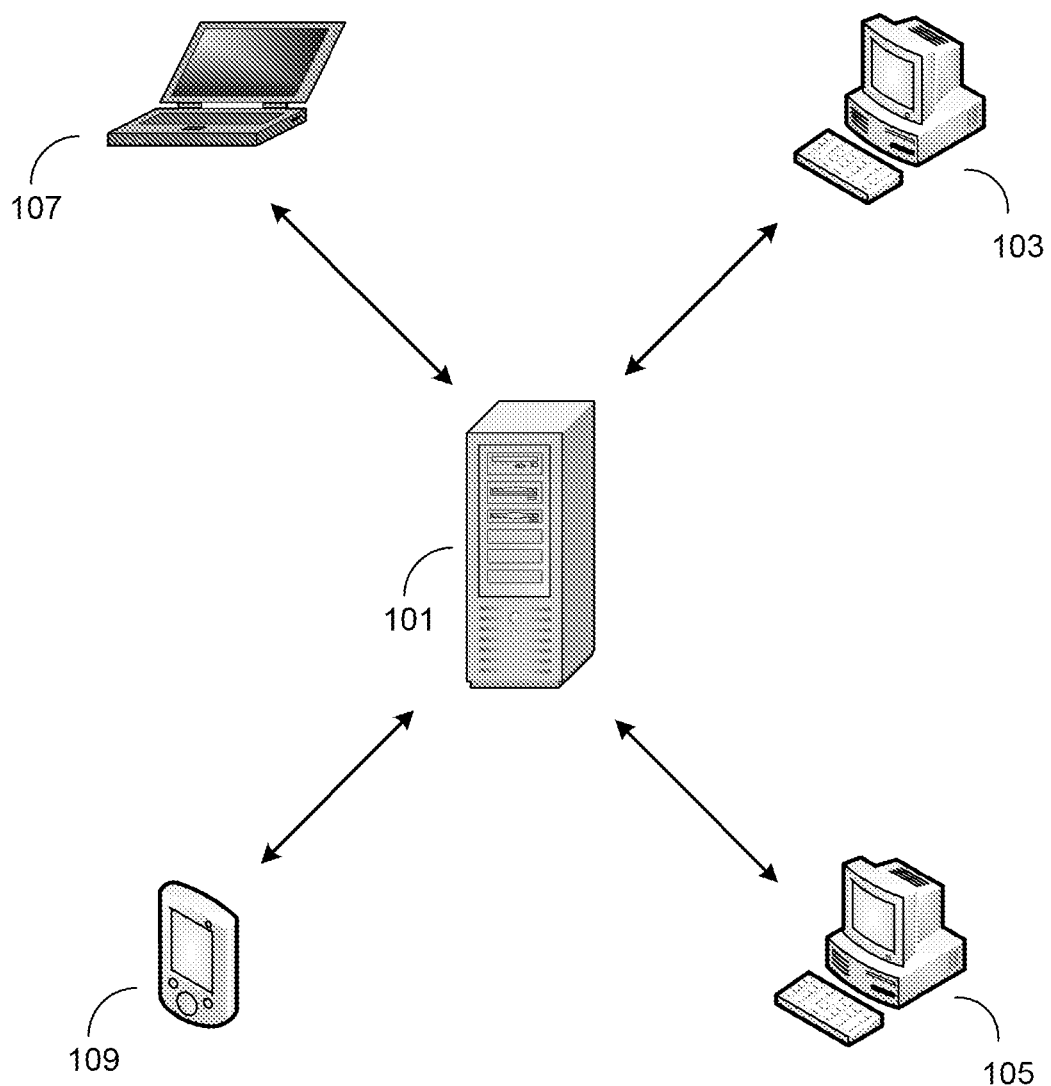
FIG. 1 is a client-server system in accordance with an embodiment of the invention.

FIG. 1 depicts a client-server system for sharing documents. Client-server system 100 includes a server 101 and multiple client computing devices 103 through 109. These client computing devices may include desktop computers like devices 103 and 105, laptop computers like device 107, and handheld electronic devices like device 109. Computing devices that can be used in client-server system 100 are not limited to the devices depicted in FIG. 1 and can encompass a wide variety of devices. Each computing device can communicate with server 101. The devices can communicate with the server through a local area network (LAN), wide area network (WAN), an Internet connection, or any other form of electronic communication. Each computing device in system 100 has an Internet browser installed on it. Internet browsers allow computing devices to view web pages on the Internet. Examples of Internet browsers are Google Chrome, Microsoft Internet Explorer and Mozilla Firefox, but the types of Internet browsers contemplated are not limited to the ones listed. Server 101 can store documents that can be accessed by any computing device in system 100. Such documents may include word processing documents spreadsheets or presentations. One or more users can access the server 101 through the computing devices to view and edit documents or share documents with other users. Server 101 controls rendering of the text in these documents on the computing devices to ensure uniform appearance of the text regardless of the specific hardware or software capabilities of the computing devices. Although illustrated as a single device in FIG. 1, server 101 may be implemented as, for example, a single computing device or as multiple distributed computing devices.

Figure 2:
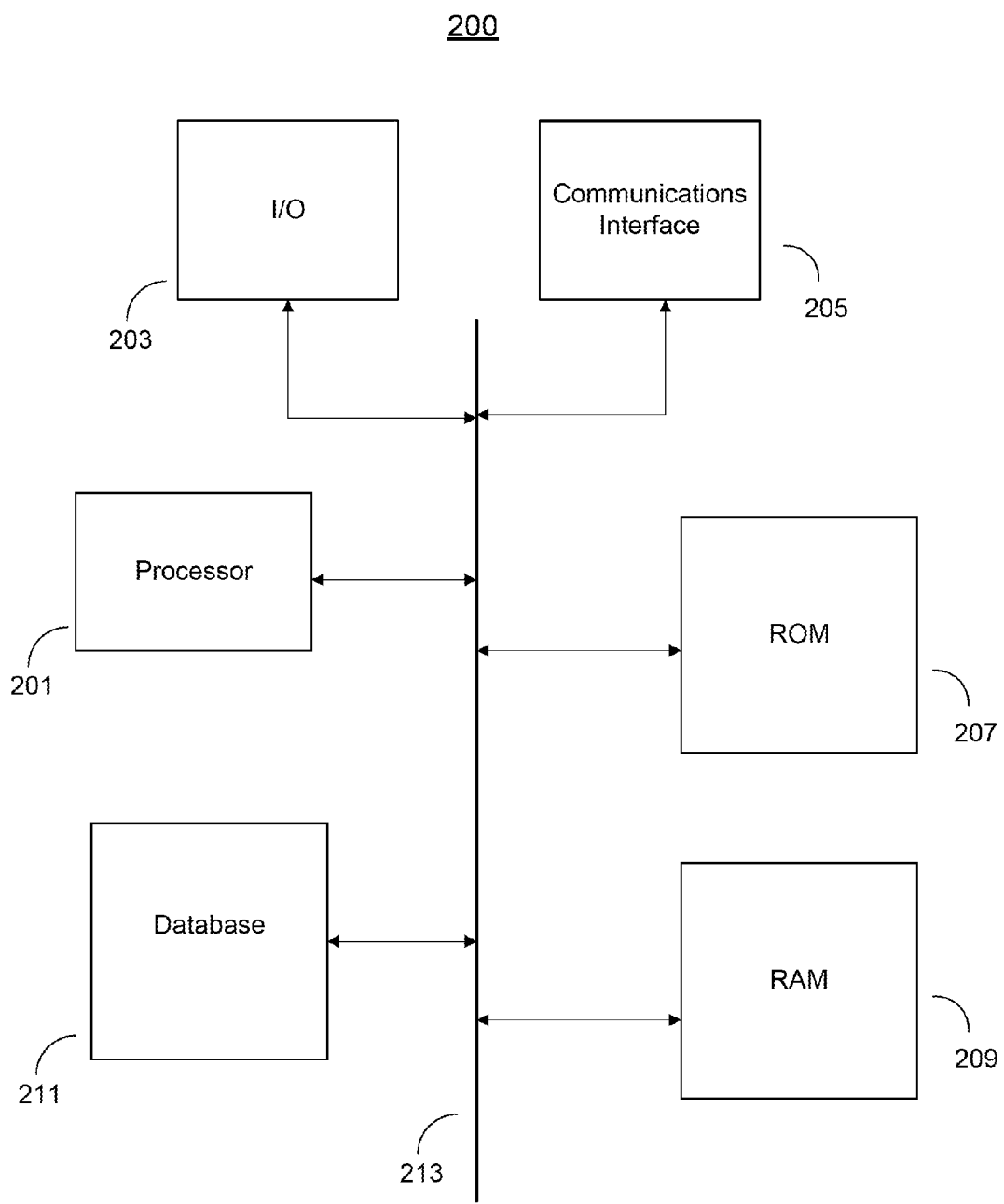
FIG. 2 is a server component diagram in accordance with an embodiment of the invention.

The server in client-server system 100 will now be discussed in greater detail. FIG. 2 depicts a server 200 which includes a processor 201, input and output devices 203, a communications interface 205, read-only memory (ROM) 207, random access memory (RAM) 209, database 211, and bus 213. The bus 213 enables every component in server 200 to electronically communicate with each other. Input/output devices 203 may include a keyboard, mouse, display screen, touchpad, speakers, or any other compatible input or output device. Communications interface 205 may be a network connection, Internet connection, or any other type of electronic communication component. In one embodiment, the communications interface 205 can communicate with multiple client computing devices, such as desktop computers, laptops, and handheld devices. Database 211 can store electronic documents that can be accessed by clients through communications interface 205.

Processor 201 may be configured to perform tasks such as sending electronic documents stored in database 211 to multiple client computing devices using communications interface 205, receiving edits to electronic documents stored in database 211 from client computing devices, and generating text formatting information to be displayed on client computing devices. Processor 201 may be configured to ensure that documents stored in database 211 and distributed to different computing devices will have uniform appearance of text across the client computing devices.

Processors suitable for the execution of a computer program include, by way of example, both general and special purpose microprocessors, and any one or more processors of any kind of digital computer. Generally, a processor will receive instructions and data from RAM or ROM or both. The essential elements of a computer are a processor for performing instructions and one or more memory devices for storing instructions and data. Computer-readable media suitable for storing computer program instructions and data, such as database 211, include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Figure 3:
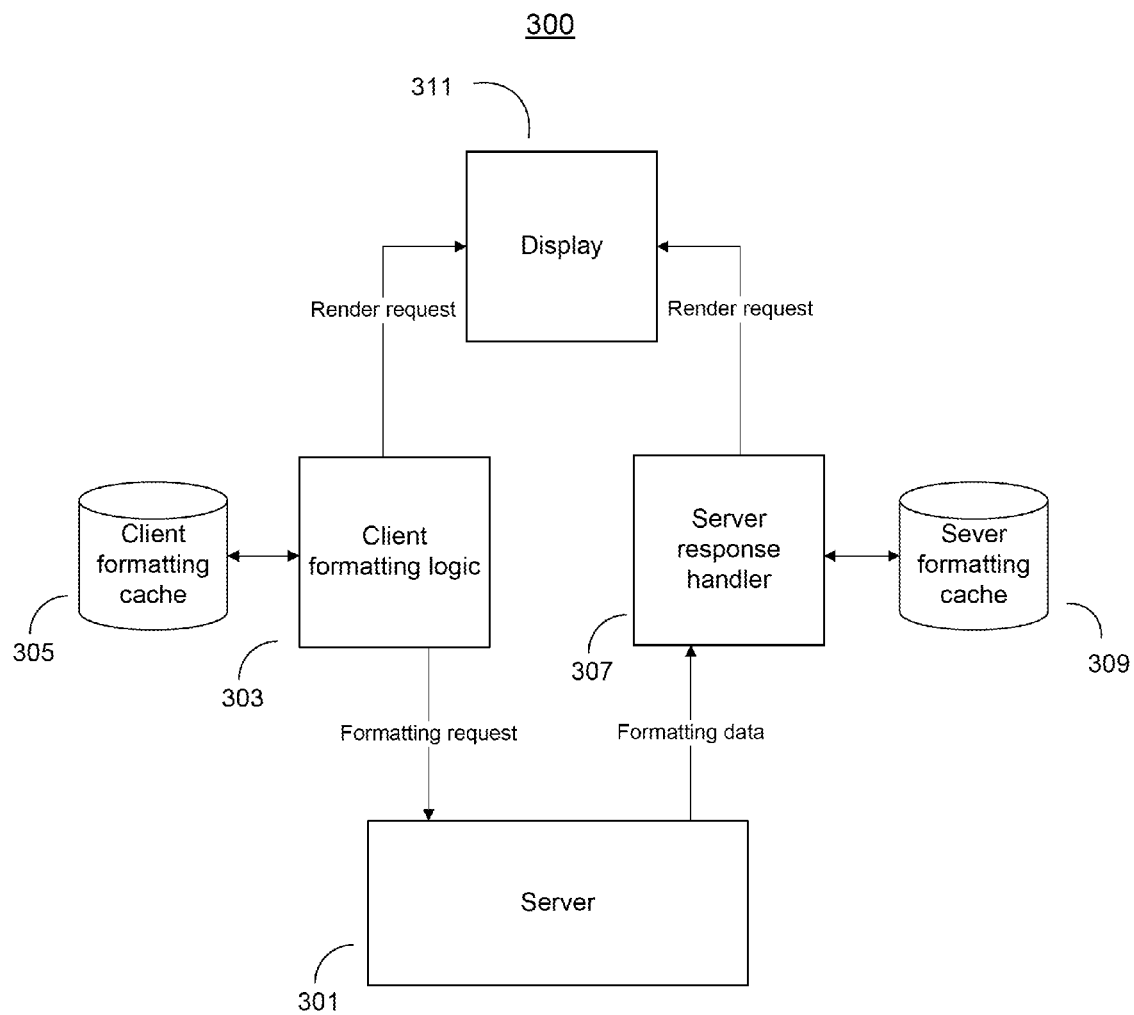
FIG. 3 is a client-server system process flow chart in accordance with an embodiment of the invention.

The interaction of a client computing device and the server will now be discussed. FIG. 3 depicts a client-server system process flow chart. In some embodiments, server 301 in FIG. 3 is similar to server 200 depicted in FIG. 2. Client formatting logic unit 303, client formatting cache 305, server response handler 307, server formatting cache 309, and display unit 311 are found on the client computing device. The client computing device, through an Internet browser, can request the display of an electronic document stored on server 301. In order for the computing device to display the text of the document, the client formatting logic unit 303 generates initial text formatting information and displays the rendered text on display 311. The initial text formatting information may also be stored on client formatting cache 305. Client formatting logic unit 303 also sends the initial text formatting information and a server formatting request to server 301. Server 301 generates revised text formatting information based on the client's request and sends the formatting data to server response handler 307. Server response handler 307 receives the revised text formatting information from server 301 and sends a render request to display 311 to re-render the text according to the server instructions. The revised text formatting information may also be stored on server formatting cache 309 so that if the computing device renders the same segment of text in the future, it can use the information stored in server formatting cache 309 rather than sending another formatting request to the server. As described in relation to FIG. 3, server 301 controls the formatting of text on the computing device and thus can render text uniformly regardless of the specific hardware and software capabilities of the computing device.

Figure 4:
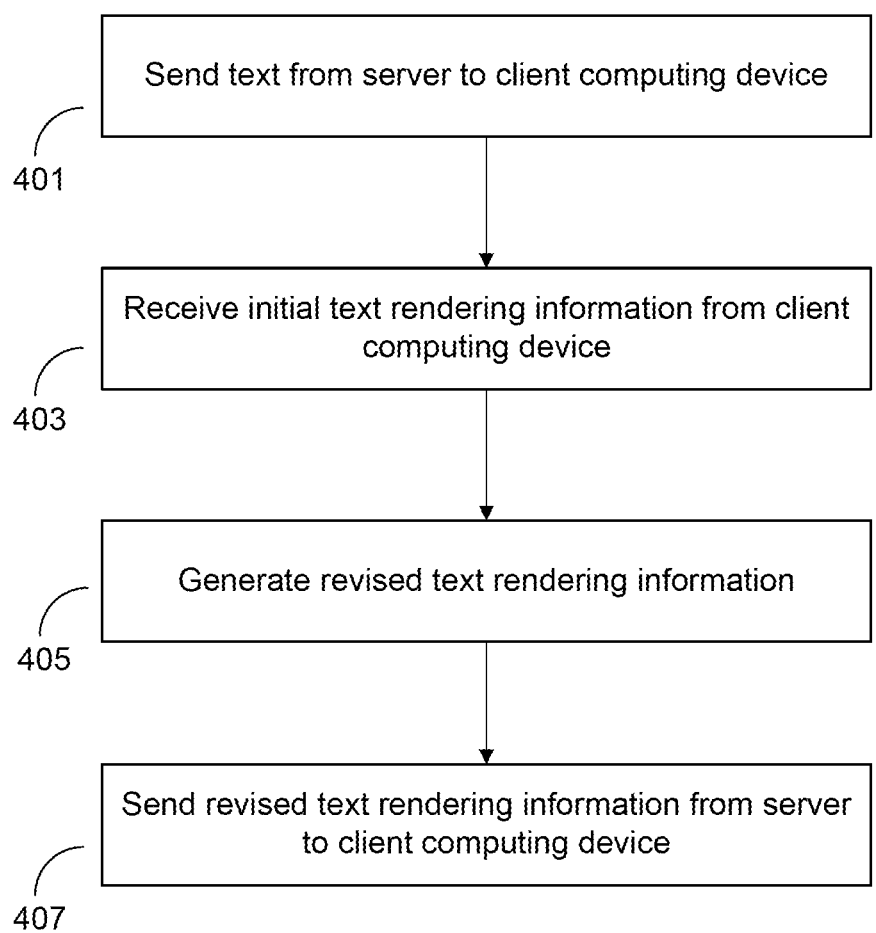
FIG. 4 is a flow chart showing a method for rendering text on a client computing device by a server in accordance with an embodiment of the invention.

Methods of operation of the server in the client-server system are now discussed. FIG. 4 is a flow chart depicting a method 400 for rendering text on a client computing device by a server. Method 400 includes sending a segment of text from a server to a client computing device, receiving initial text formatting information from the computing device, generating revised text formatting information on the server, and sending the revised text formatting information to the client computing device. In some embodiments, the server that performs method 400 is similar to the server in client-server system depicted in FIG. 3 or the server depicted in FIG. 2. Method 400 begins by the server sending a segment of text to a computing device in step 401. This step may be in response to a request by the computing device to view an electronic document stored on the server. The server sends the computing device the electronic document, including all the text within the document for display on the computing device. Communication between the server and the computing device may be effectuated by an Internet connection or other form of electronic communication.

After the server sends a segment of text to the computing device, the computing device uses local formatting information stored on the computing device to produce initial text formatting information. This initial text formatting information may include the width and height of each character, the location of line-breaks within the text, or text styling information (e.g. italics, underline). The initial text formatting information may pertain to an individual character, entire words, prefixes of words, or any other grouping of text. The computing device sends the initial text formatting information to the server in step 403.

When the server receives the initial text formatting information from the computing device, the server generates revised text formatting information in step 405. In some embodiments, the server uses Java or 2-D application programming interface (API) programs to generate the revised text formatting information. The server generates the revised text formatting information to ensure a uniform appearance of the text if the text was displayed on multiple computing devices. Thus the revised text formatting information may have different widths and heights for characters than in the initial text formatting information or may change the location of line-breaks within the text. In some embodiments, the revised text formatting information may be the same as the initial text formatting information, indicating that the computing device has already correctly rendered the text. In some embodiments, the server has a cache that stores revised text formatting information for retrieval in case a computing device requests formatting information for the same text segment.

After the server generates the revised text formatting information, the server sends this information to the computing device in step 407. Once the computing device receives the revised text formatting information, it can re-render any segments of text where the revised text formatting information differs from the initial text formatting information. In some embodiments, the revised text formatting information is stored in a cache on the computing device. If the same piece of text is re-rendered at a later time, the computing device can retrieve the revised text formatting information from its cache rather than communicating with the server again. Thus method 400 enables a server to control the rendering of text on a computing device to ensure uniform appearance of text across a variety of computing devices.

Figure 5:
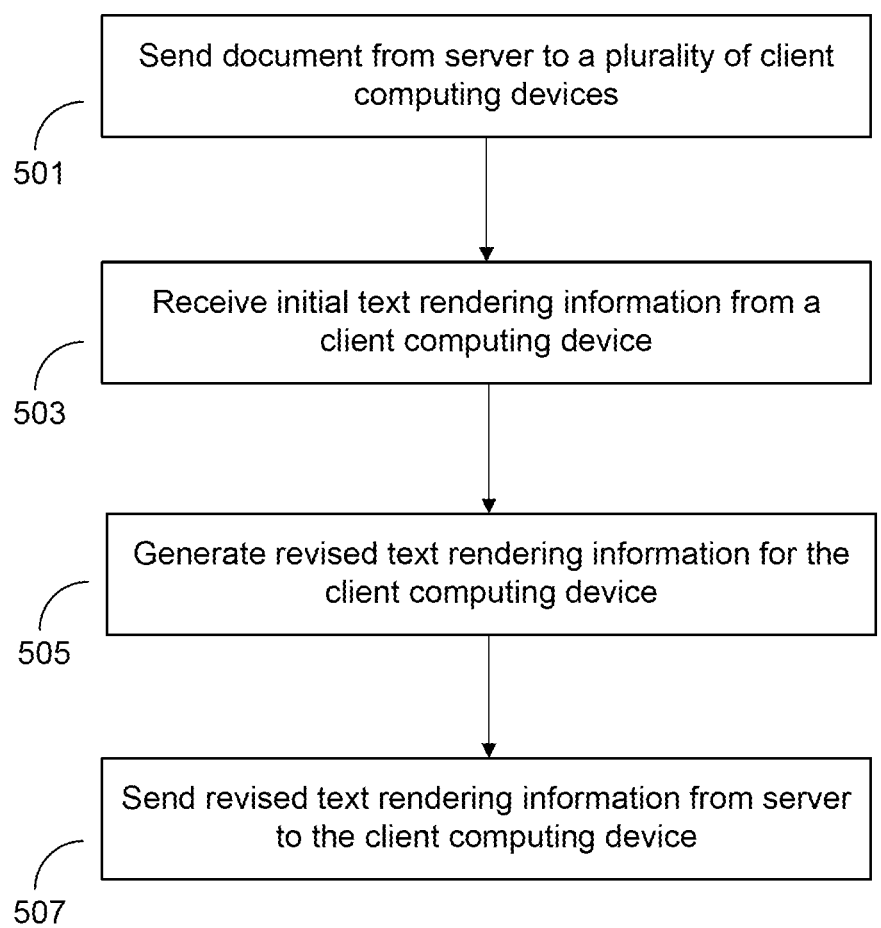
FIG. 5 is a flow chart showing a method for displaying a document on a plurality of client computing devices by a server in accordance with an embodiment of the invention.

Next, methods of rendering documents on multiple computing devices using a server are discussed. FIG. 5 is a flow chart depicting a method of displaying a document on a plurality of client computing devices by a server. Method 500 includes sending a document from the server to a plurality of client computing devices, receiving initial text formatting information from a computing device in the plurality of computing devices, generating revised text formatting information for the computing device, and sending the revised text rendering information to the computing device. In some embodiments, the system that performs method 500 is similar to the client-server system depicted in FIG. 1 or 3, and the server in method 500 may be similar to the server depicted in FIG. 2. Method 500 begins by the server sending a document to a plurality computing devices in step 501. This step may be in response to a request by a plurality of computing devices to view the document stored on the server. The requests to view the document by the plurality of computing devices do not have to occur at the same time. The server can handle asynchronous requests by computing devices to view the document. The server sends each of the computing devices the same electronic document, including all the text within the document for display on each computing device. Communication between the server and the plurality of computing devices may be effectuated by an Internet connection or other form of electronic communication.

After the server sends the document to each computing device, the computing devices uses local rendering information stored on each of the computing devices to produce initial text formatting information. This initial text formatting information may include the width and height of each character, the location of line-breaks within the text, or text styling information. The initial text formatting information may pertain to an individual character, entire words, prefixes of words, or any other grouping of text. Each computing device sends its initial text formatting information to the server in step 503.

When the server receives the initial text formatting information from a computing device in the plurality of computing devices, the server generates revised text formatting information for the computing device in step 505. In some embodiments, the server uses Java or 2-D application programming interface (API) programs to generate the revised text formatting information. The revised text formatting information may have different widths and heights for characters or may change the location of line-breaks within the text. The server generates the revised text formatting information to ensure a uniform appearance of the text across the plurality of computing devices. Thus the revised text formatting information generated by the server for the same segment of text should be the same for all computing devices. For some computing devices, the revised text formatting information may be the same as the initial text formatting information, indicating that the computing device has already correctly rendered the text. In some embodiments, the server has a cache that stores revised text formatting information for retrieval in case another computing device requests formatting information for the same text segment.

After the server generates the revised text formatting information, the server sends this information to the computing device in step 507. Once the computing device receives the revised text formatting information, it can re-render any segments of text where the revised text formatting information differs from the initial text formatting information. In some embodiments, the revised text formatting information is stored in a cache on the computing device. If the same piece of text is re-rendered at a later time, the computing device can retrieve the revised text formatting information from its cache rather than communicating with the server again. Thus method 500 enables a server to control the rendering of text on a plurality of computing devices to ensure uniform appearance of text.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Further, certain portions of the invention may be implemented as "logic" or a "component" that performs one or more functions. This logic may include hardware, such as an application specific integrated circuit or a field programmable gate array, software, or a combination of hardware and software.

What is claimed is:

1. A computerized method for rendering text on a client computing device by a server, the method comprising:
   sending the text from the server to the client computing device for rendering;
   receiving at the server initial text formatting information from the client computing device;
   generating revised text formatting information on the server; and
   sending the revised text formatting information from the server to the client computing device for re-rendering of the text in accordance with the revised text formatting information.

2. The method of claim 1, wherein the initial text formatting information and revised text formatting information comprises line height and line width information.

3. The method of claim 1, wherein the initial text formatting information and revised text formatting information comprises line break information.

4. The method of claim 1, wherein the initial text formatting information and revised text formatting information comprises text styling information.

5. The method of claim 1, wherein the initial text formatting information and revised text formatting information comprises text formatting information for characters, words, or symbols.

6. The method of claim 1, wherein generating the revised text formatting information is accomplished using Java or 2-D API program run on the server.

7. The method of claim 1, wherein the revised text formatting information is saved on the client computing device or the server.

8. The method of claim 1, wherein the text is associated with a document stored on the server, and the text in the document can be viewed and edited on the client computing device.

9. A computerized method for displaying a document on a plurality of client computing devices by a server, the method comprising:
   sending the document from the server to the plurality of client computing devices;
   receiving initial text formatting information at the server from a first client computing device in the plurality of client computing devices;
   generating revised text formatting information on the server for the first client computing device in the plurality of client computing devices; and
   sending the revised text formatting information from the server to the first client computing device in the plurality of client computing devices for re-rendering of the document so that the document text appears substantially the same on each client computing device.

10. The method of claim 9, wherein the initial text formatting information and revised text formatting information comprises line height and line width information.

11. The method of claim 9, wherein the initial text formatting information and revised text formatting information comprises line break information.

12. The method of claim 9, wherein the initial text formatting information and revised text formatting information comprises text styling information.

13. The method of claim 9, wherein the initial text formatting information and revised text formatting information comprises text formatting information for characters, words, or symbols.

14. The method of claim 9, wherein generating the revised text formatting information is accomplished using Java or 2-D API program run on the server.

15. The method of claim 9, wherein the initial text formatting information from the first client computing device is different than the initial text formatting information from a second client computing device in the plurality of client computing devices.

16. The method of claim 9, wherein the revised text formatting information is saved on the server or the first client computing device.

17. The method of claim 9, wherein the document can be viewed and edited on each client computing device in the plurality of client computing devices.

18. A system for displaying a document on a plurality of client computing devices, the system comprising:
   a server, wherein the server is configured to:
      send the document to the plurality of client computing devices;
      receive initial text formatting information from each client computing device;
      generate revised text formatting information for each client computing device; and
      send the revised text formatting information to each client computing device for re-rendering of the document so that the document text appears substantially the same on each client computing device.

19. The system of claim 18, wherein the initial text formatting information and revised text formatting information comprises line height and line width information.

20. The system of claim 18, wherein the initial text formatting information and revised text formatting information comprises line break information.

21. The system of claim 18, wherein the initial text formatting information and revised text formatting information comprises text styling information.

22. The system of claim 18, wherein the initial text formatting information and revised text formatting information comprises text formatting information for characters, words, or symbols.

23. The system of claim 18, wherein server runs a Java or 2-D API program that generates the revised text formatting information.

24. The system of claim 18, wherein the initial text formatting information is different for each client computing device in the plurality of client computing devices.

25. The system of claim 18, wherein the revised text formatting information is saved on the server or each client computing device.

26. The system of claim 18, wherein the document can be viewed and edited on each client computing device in the plurality of client computing devices.

27. A computerized method for server-side rendering of text on a client computing device, the method comprising:
   receiving text from the server on the client computing device;
   generating initial text formatting information on the client computing device;
   sending the initial text formatting information to the server;
   receiving revised text formatting information from the server; and re-rendering the text in accordance with the revised text formatting information.

* * * * *